US012664637B2

(12) United States Patent
Laengle et al.

(10) Patent No.: US 12,664,637 B2
(45) Date of Patent: Jun. 23, 2026

(54) METHOD AND APPARATUS FOR ANALYZING AN IMAGE OF A MICROLITHOGRAPHIC MICROSTRUCTURED COMPONENT

(71) Applicant: Carl Zeiss SMT GmbH, Oberkochen (DE)

(72) Inventors: Mario Laengle, Jena (DE); Dmitry Klochkov, Schwaebisch Gmuend (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 434 days.

(21) Appl. No.: 17/751,757

(22) Filed: May 24, 2022

(65) Prior Publication Data

US 2022/0383485 A1 Dec. 1, 2022

(30) Foreign Application Priority Data

May 27, 2021 (DE) .......................... 102021113764.0

(51) Int. Cl.
*G06V 20/69* (2022.01)
*G06T 7/00* (2017.01)
(Continued)

(52) U.S. Cl.
CPC .............. *G06T 7/0004* (2013.01); *G06T 7/12* (2017.01); *G06V 10/26* (2022.01); *G06V 10/30* (2022.01);
(Continued)

(58) Field of Classification Search
CPC ...................... G06T 7/0004; G06T 7/12; G06T 2207/30148; G06V 20/695; G06V 10/457;
(Continued)

(56) References Cited

U.S. PATENT DOCUMENTS

2008/0204735 A1* 8/2008 Heiden .................. G01B 11/03
356/237.4
2009/0039263 A1 2/2009 Matsuoka et al.
(Continued)

FOREIGN PATENT DOCUMENTS

CN 103455994 A 12/2013
CN 105809625 7/2016
(Continued)

OTHER PUBLICATIONS

Cao, Liang, et al. "Automatic SRAF printing detection based on contour extraction." Photomask Technology 2017. vol. 10451. SPIE, 2017 (Year: 2017).*
(Continued)

*Primary Examiner* — Andrew M Moyer
*Assistant Examiner* — Dylan John Mendez Muniz
(74) *Attorney, Agent, or Firm* — Fish & Richardson P.C.

(57) ABSTRACT

The invention relates to a method and to an apparatus for analyzing an image of a microlithographic microstructured component wherein in the image each of a multiplicity of pixels is assigned in each case an intensity value. A method according to the invention comprises the following steps: isolating a plurality of edge fragments in the image; classifying each of the isolated edge fragments either as a relevant edge fragment or as an irrelevant edge fragment; and ascertaining contiguous segments in the image based on the relevant edge fragments.

31 Claims, 8 Drawing Sheets

A

B

A

B

(51) Int. Cl.

| | | |
|---|---|---|
| *G06T 7/11* | (2017.01) | |
| *G06T 7/12* | (2017.01) | |
| *G06T 7/13* | (2017.01) | |
| *G06V 10/26* | (2022.01) | |
| *G06V 10/30* | (2022.01) | |
| *G06V 10/44* | (2022.01) | |
| *G06V 30/20* | (2022.01) | |

(52) U.S. Cl.
CPC .......... *G06V 10/457* (2022.01); *G06V 20/695* (2022.01); *G06V 20/698* (2022.01); *G06T 2207/30148* (2013.01); *G06V 2201/06* (2022.01)

(58) Field of Classification Search
CPC ...... G06V 20/698; G06V 10/30; G06V 10/26; G06V 2201/06
See application file for complete search history.

(56) References Cited

U.S. PATENT DOCUMENTS

| | | | | |
|---|---|---|---|---|
| 2009/0092905 | A1* | 4/2009 | Nakaue | G03F 1/84 |
| | | | | 83/76.1 |
| 2010/0303361 | A1* | 12/2010 | Mitsui | G06V 10/44 |
| | | | | 382/199 |
| 2012/0076420 | A1* | 3/2012 | Kono | G06T 7/13 |
| | | | | 382/199 |
| 2012/0257039 | A1 | 10/2012 | Abe | |
| 2013/0198698 | A1 | 8/2013 | Lei et al. | |
| 2013/0279793 | A1* | 10/2013 | Toyoda | G06T 7/001 |
| | | | | 382/145 |
| 2018/0047167 | A1* | 2/2018 | Xu | G06T 7/155 |
| 2019/0005650 | A1 | 1/2019 | Oya | |
| 2019/0129320 | A1 | 5/2019 | Hellweg | |
| 2019/0147127 | A1 | 5/2019 | Su et al. | |
| 2020/0326632 | A1 | 10/2020 | Fang et al. | |
| 2021/0142457 | A1 | 5/2021 | Sugihara | |
| 2021/0256705 | A1* | 8/2021 | Yu | G06F 17/16 |
| 2022/0229375 | A1 | 7/2022 | Fu | |

FOREIGN PATENT DOCUMENTS

| | | | |
|---|---|---|---|
| CN | 108537778 A | 9/2018 | |
| CN | 109709764 | 5/2019 | |
| CN | 112819845 A | 5/2021 | |
| CN | 113874787 | 12/2021 | |
| CN | 113924525 | 1/2022 | |
| JP | H10-289318 | 10/1998 | |
| JP | 2002-202586 | 7/2002 | |
| JP | 2005-285898 | 10/2005 | |
| JP | 2005-302445 | 10/2005 | |
| JP | 2010-276504 | 12/2010 | |
| JP | 2012073942 A * | 4/2012 | G06T 7/0085 |
| JP | 2021-077229 | 5/2021 | |
| WO | WO-2004051573 A2 * | 6/2004 | G06T 7/12 |
| WO | WO 2020/233950 | 11/2020 | |
| WO | WO 2021/206144 | 10/2021 | |

OTHER PUBLICATIONS

Office Action issued by the German Patent Office for Application No. DE 10 2021 113 764.0, dated Jan. 4, 2022 (with English Translation).

Cao et al., "Automatic SRAF printing detection based on contour extraction", *Photomask Technology 2017, International Society for Optics and Photonics, 2017, Proc. of SPIE*, vol. 10451, pp. 104511J-1 to 104511J-9 (2017).

Ersoy et al., "Skeleton-Based Edge Bundling for Graph Visualization", *IEEE Transactions on Visualization and Computer Graphics*, vol. 17, No. 12, pp. 2364-2373 (Dec. 2011).

Kass et al., "Snakes: Active Contour Models", *International Journal of Computer Vision*, pp. 321-331 (1988).

Office Action issued by the Taiwan Patent Office for Application No. TW 111119673, dated Jun. 28, 2023 (with English Translation).

Office Action issued by the Japanese Patent Office for Application No. JP 2022-086725 by Examiner Akira Imai, dated Jul. 20, 2023 (with English Translation).

European Search Report issued by the European Patent Office for Application No. EP 22173636.6-1207, dated Oct. 24, 2022.

Schneider et al., "Framework for SEM contour analysis", *Proceedings of SPIE*, vol. 10145, pp. 1014513-1-1014513-13 (2017).

Office Action issued by the European Patent Office for Application No. EP 22 173 636.6, dated Dec. 23, 2024.

Office Action issued by the Korean Patent Office for Application No. KR 10-2022-0062695, dated May 1, 2025 (with English Translation).

Office Action issued by the German Patent Office for Application No. DE 10 2021 113 764.0, dated Jul. 10, 2025 (with English Translation).

Lin et al., "Real-time Lane Detection Based on Extended Edge-Linking Algorithm," *Second International Conference on Computer Research and Development, IEEE*, pp. 725-730 (201).

Office Action issued by the Chinese Patent Office for Application No. CN 202210594647.6, dated Jun. 27, 2025 (with English Translation).

Office Action issued by the German Patent Office for Application No. DE 10 2021 113 764.0, dated Jul. 10, 2025 (English Translation Only).

Notice of Allowance in Chinese Appln. No. 202210594647.6, mailed on Jan. 6, 2026, 8 pages (with English translation).

Notice of Allowance in Korean Appln. No. 10-2022-0062695, mailed on Jan. 28, 2026, 4 pages (with English translation).

* cited by examiner

METHOD AND APPARATUS FOR ANALYZING AN IMAGE OF A MICROLITHOGRAPHIC MICROSTRUCTURED COMPONENT

CROSS-REFERENCE TO RELATED APPLICATION

This application claims priority of German Patent Application DE 10 2021 113 764.0, filed on May 27, 2021, the content of which is hereby incorporated by reference in its entirety.

TECHNICAL FIELD

The invention relates to a method and to an apparatus for analyzing an image of a microlithographic microstructured component, in particular of a mask or of a wafer.

BACKGROUND

Microlithography is used for producing microstructured components, such as integrated circuits or liquid crystal displays (LCDs), for example. The microlithography process is conducted in what is called a projection illumination apparatus, which comprises an illumination device and a projection lens. The image of a mask (=reticle) illuminated by use of the illumination device is projected here by use of the projection lens onto a substrate (e.g. a silicon wafer) that is coated with a light-sensitive layer (photoresist) and arranged in the image plane of the projection lens, in order to transfer the mask structure onto the light-sensitive coating of the substrate.

As the structure sizes of both the masks used in the lithography process and the microlithographically structured wafers become ever smaller, the analysis and the processing or repair of these components is becoming ever more of a demanding challenge in practice.

Images acquired microscopically, among other things, using electron beams or ion beams are used for the analysis to ascertain any differences between the respective measurement image and a design image having the desired structure of the mask and to use them as a basis for repairing the mask or wafer. The images to be analyzed (e.g. scanning electron microscope (SEM) recordings of a mask or a wafer) are here as a rule composed of a multiplicity of pixels, wherein each pixel is assigned an intensity value as a "greyscale value."

Different approaches are known in practice for differentiating, by way of contour extraction or detection, the coated or structure-carrying regions from the uncoated or structure-less regions of the mask or of the wafer. A conventional approach includes for example contour extraction or contour detection on the basis of the second derivative of the greyscale value profile in connection with the application of various filter mechanisms and algorithms for closing existing contours. A further known approach is based on the intensity values themselves (i.e. the zero-order derivative of the greyscale value profile) exceeding threshold values.

It has frequently proven difficult here in practice to reliably distinguish between the segments that are to be separated from one another (i.e. the uncoated or structure-carrying region and the coated or structure-less region) during the analysis of comparatively strongly pixellated and possibly very noisy images. This is true in particular if the regions to be separated have on average approximately the same brightness as a result of a pronounced pixellation.

Against the above-mentioned background, the provision of a robust method that provides correct results for a great variety of different scenarios or microscopic recordings in practice represents a significant challenge.

SUMMARY

It is an aspect of the present invention to provide a method and an apparatus for analyzing an image of a microlithographic microstructured component, which facilitate a reliable characterization while at least partially avoiding the above-described problems.

This aspect is achieved by use of the method and the apparatus, respectively, according to the features of the alternative independent patent claims.

The invention relates in particular to a method for analyzing an image of a microlithographic microstructured component, wherein in the image each of a multiplicity of pixels is assigned in each case an intensity value, wherein the method comprises the steps of:

isolating a plurality of edge fragments in the image;

classifying each of the isolated edge fragments either as a relevant edge fragment or as an irrelevant edge fragment; and ascertaining contiguous segments in the image based on the relevant edge fragments.

Here and below, "relevant" edge fragment is understood to mean an edge fragment that is considered to be an actual boundary between the segments that are ultimately to be separated during the image analysis according to the invention, i.e. a boundary between a coated or structure-carrying region and an uncoated or structure-less region.

The invention is based in particular on the concept of initially finding all the edge pixels in a microscopically acquired image that is to be analyzed and to isolate therefrom a plurality of edge fragments in order to only then remove irrelevant edge fragments (which in reality do not represent a boundary between a coated or structure-carrying and an uncoated or structure-less region) from the isolated edge fragments.

In embodiments of the invention, as will be described in more detail below, isolating edge fragments includes in particular, after skeletonization of the pixellated image (during which any broader edge fragments are replaced with edge fragments having a width of only one pixel), deleting or eliminating comparatively short branches (in particular those having the length of merely one pixel) and/or deleting or eliminating intersection points (i.e. points in which at least three lines intersect in the skeletonized image). The invention here includes in particular the principle of, despite the previously described elimination of branches and/or intersection points, initially holding on to the edge fragments that remain in this case, that is to say not yet eliminating them at this stage of the method and undertaking any classification in this respect into "relevant" and "irrelevant" only during a later method step.

In embodiments, the previously mentioned classification into "relevant" and "irrelevant" edge fragments takes place on the basis of the average intensity gradient of isolated edge fragments, wherein a value exceeding or falling below an appropriately defined threshold value can in turn be used as the basis as a quantitative criterion.

In embodiments of the invention, said threshold value is in turn preferably defined such that specific edge fragments (or the associated average intensity gradients) either are not taken into account when defining the threshold value or are reduced in terms of the gradient value.

Edge fragments that are not to be taken into account or are to be eliminated can in particular be, in embodiments, particularly short edge fragments, particularly high-contrast edge fragments, particularly low-contrast edge fragments and/or edge fragments located near a relatively brighter edge fragment. For defining the threshold value, edge fragments located near a comparatively higher-contrast edge fragment can furthermore also initially be reduced in terms of the average gradient value (thus be "weakened"). Such pre-processing can ensure that for example comparatively short edge fragments having a relatively high intensity contrast are "eliminated" when defining the threshold value for the classification (differentiation between "relevant" and "irrel-evant" edge fragments) in order to avoid in this regard any falsification of the threshold value whose use is sensible due to "outliers" in the pixel distribution of the values of the average intensity gradient.

In embodiments of the invention, contiguous segments are ascertained on the basis of the relevant edge fragments without prior closing of gaps between the edge fragments. In embodiments of the invention, as will be described in more detail below, the pixels located in the region of the inter-ruption between successive edge fragments are assigned in a distance-based manner even without the presence of completely closed edge paths, to be precise by virtue of an ascertainment for each of said pixels as to whether said pixel is positioned closer to the one region or to the other region of the adjoining regions (i.e. closer to the coated or the uncoated region). Not closing gaps in advance present between the edge fragments before contiguous segments are ascertained here has the advantage that the method accord-ing to the invention is accelerated (i.e. the required compu-tation time is shortened) and, in addition, that the method is less susceptible to errors, because by electing to not close the edges in advance, any errors associated with such a step are also avoided.

According to an embodiment, irrelevant edge fragments are furthermore eliminated during the ascertainment of contiguous segments.

According to an embodiment, after contiguous segments have been ascertained, edge fragments are combined into object edges and the edge coordinates are computed in a subpixel-wise manner.

According to an embodiment, after edge fragments have been combined into object edges in this way, irrelevant object edges are eliminated.

According to an embodiment, after irrelevant object edges have been eliminated, a segment image is computed.

According to an embodiment, image pre-processing is carried out for reducing the noise component before a plurality of edge fragments are isolated.

According to an embodiment, isolating a plurality of edge fragments comprises eliminating branches whose lengths are below a specified value.

According to an embodiment, isolating a plurality of edge fragments comprises eliminating intersection points at which at least three edges intersect.

According to an embodiment, the image is divided by way of the segments into a total of two different regions which differ in terms of the material that is located in the respective region.

According to one embodiment, the microstructured com-ponent is a mask. The mask can be designed in particular for a working wavelength of less than 250 nm, in particular for a working wavelength of less than 200 nm, more particularly for a working wavelength of less than 15 nm.

According to a further embodiment, the microstructured component is a wafer.

The invention furthermore relates to an apparatus for analyzing an image of a microlithographic microstructured component, wherein the apparatus is designed to carry out a method having the features described above.

With regard to advantages and preferred configurations of the device, reference is made to the above explanations in association with the method according to the invention.

Further refinements of the invention can be gathered from the description and the dependent claims.

The invention is explained in greater detail below on the basis of exemplary embodiments illustrated in the accom-panying figures.

BRIEF DESCRIPTION OF DRAWINGS

FIGS. 8A-8B show schematic illustrations for elucidating a further embodiment of the method according to the inven-tion when applied to the analysis of an SEM image of a wafer.

DETAILED DESCRIPTION

Embodiments of the method according to the invention will be explained in more detail below with reference to the flowchart shown in FIG. 1 and the schematic illustrations of FIG. 2 to FIG. 8B.

Figure 1:
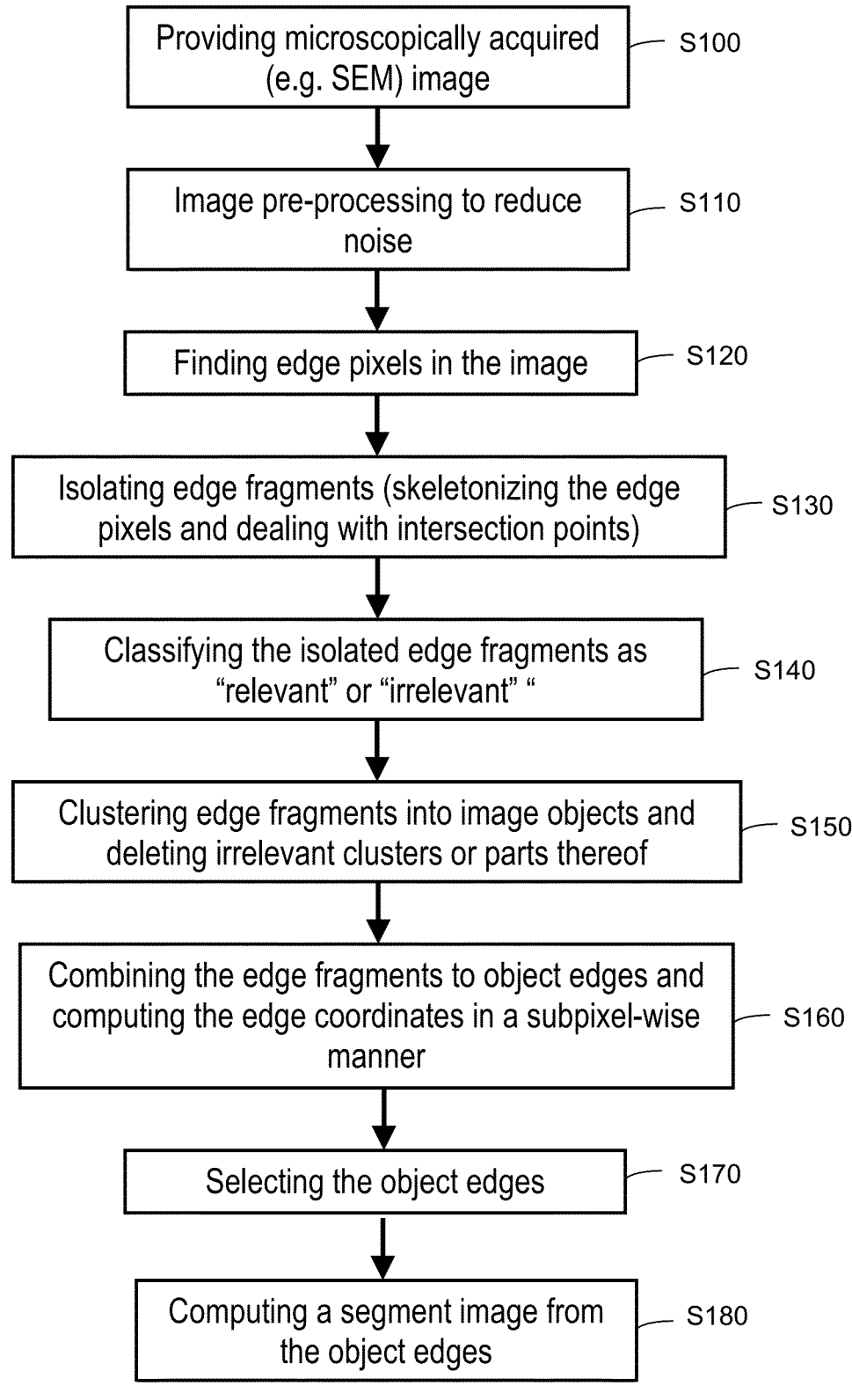
FIG. 1 shows a flowchart for explaining the possible sequence of one embodiment of the method according to the invention.

According to FIG. 1, a microscopically acquired image, e.g. an image of a mask or a wafer recorded by a scanning electron microscope (SEM), is initially provided in a step S100.

The image is then analyzed using the method according to the invention, having the method steps which will be described below, to the effect that the regions carrying in each case a coating or structure are differentiated from the structure-less or uncoated regions. With regard to the coated regions, the terms "segments" respectively delimited by "edges" will be used below. Furthermore, sections of such edges will be referred to below as "edge fragments." Fur-thermore, the image to be analyzed is composed of a multiplicity of pixels, wherein each pixel is assigned an intensity value (as a "greyscale value").

The image to be analyzed typically has a pronounced noise component (wherein e.g. pixels having a low intensity value and pixels having a comparatively large intensity value may be immediately adjacent to one another). To reduce said noise, image pre-processing is initially carried out in step S110, wherein in principle any suitable image smoothing methods can be combined with one another. Methods that are suitable for example comprise binning, Gaussian filtering, low-pass filtering, etc. Merely by way of example, it is possible here for e.g. four (or possibly more or fewer) mutually adjacent pixels to be replaced in each case by a single pixel, wherein this pixel is then assigned the average intensity value of the four pixels.

In a subsequent step S120, edge pixels are initially identified or extracted from the correspondingly pre-processed or smoothed image. In order to capture in this case all edge pixels if possible, preferably a plurality of edge extraction methods that are known per se in each case are used, or the same edge extraction method is applied multiple times with different parameters. Suitable known methods are, for example, "Canny," "Laplacian of Gaussian," "Sobel," etc.

Figure 2:
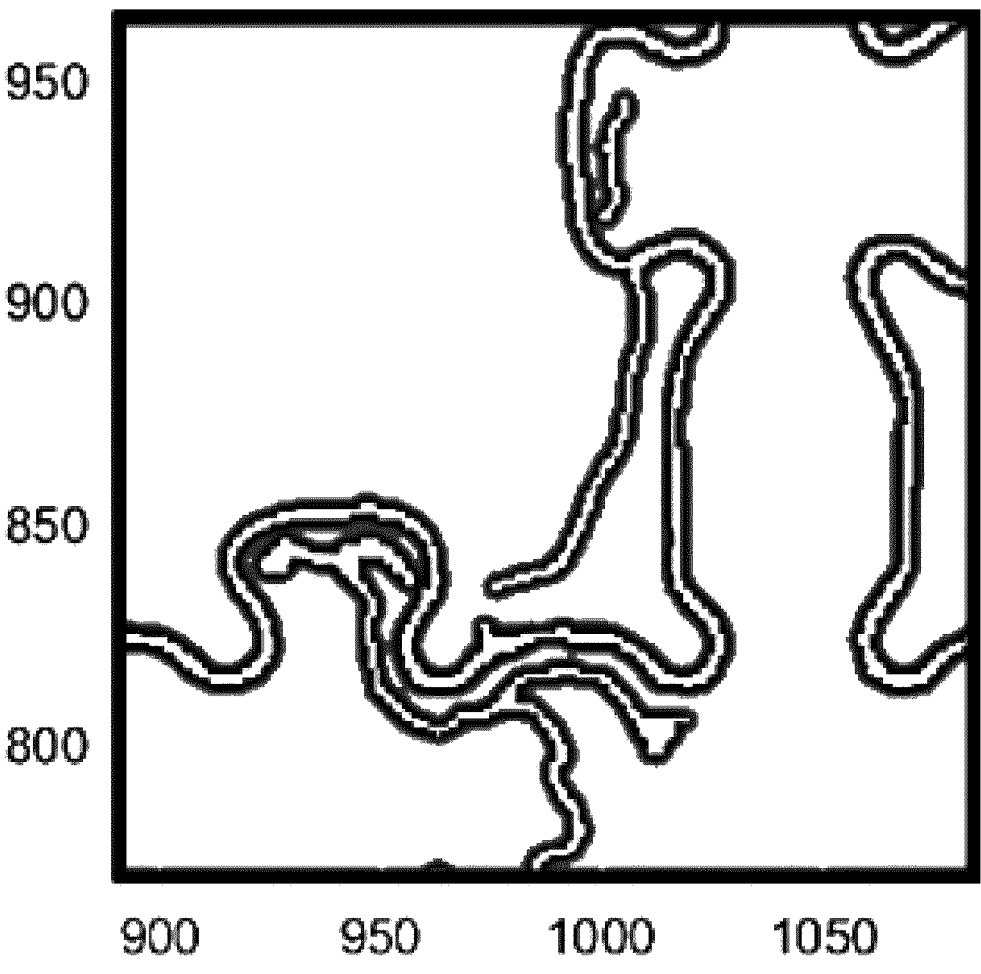
FIG. 2 shows an exemplary result of an edge detection carried out as part of the method according to the invention of FIG. 1.

The edges found or extracted in this step S120 typically also have—as is illustrated by way of example in FIG. 2—a width (possibly varying along the respective edge) which at least sectionally exceeds the width of one pixel.

Figure 3A:
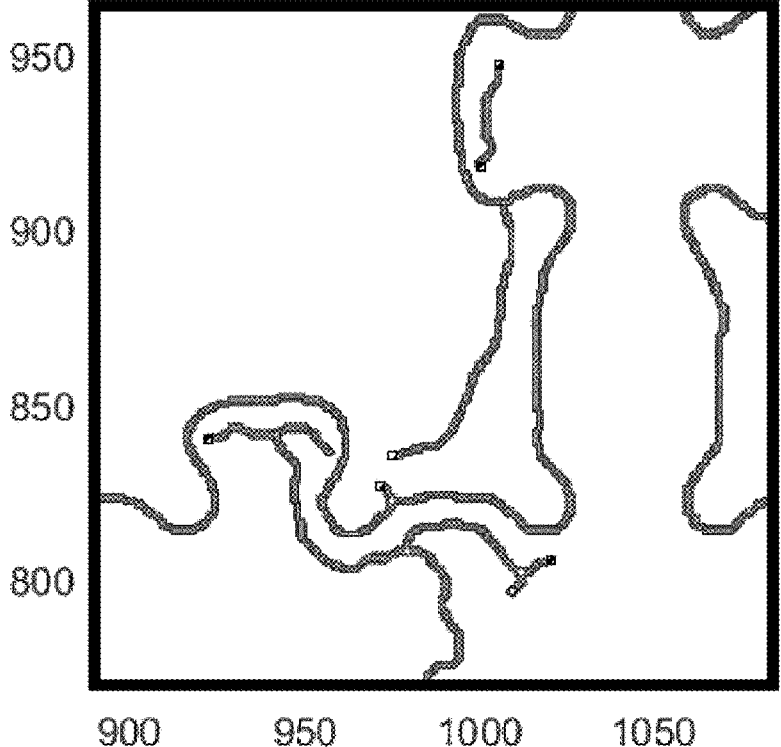
FIGS. 3A-3B show results of an isolation of edge frag-ments, performed as part of the method according to the invention, including elimination of branches (FIG. 3A) and intersection points (FIG. 3B)
Figure 3B:
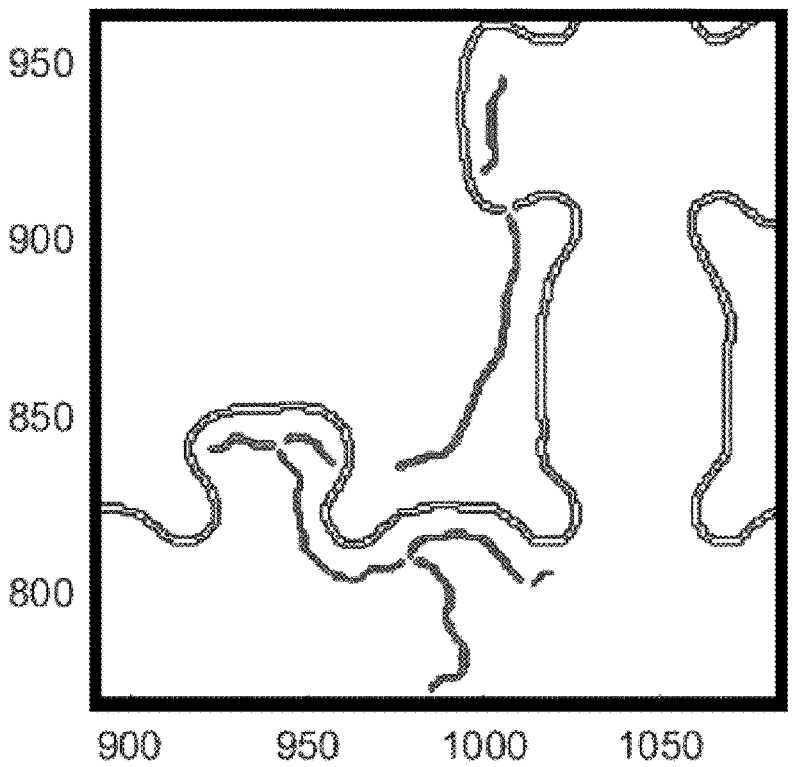
Figure 4A:
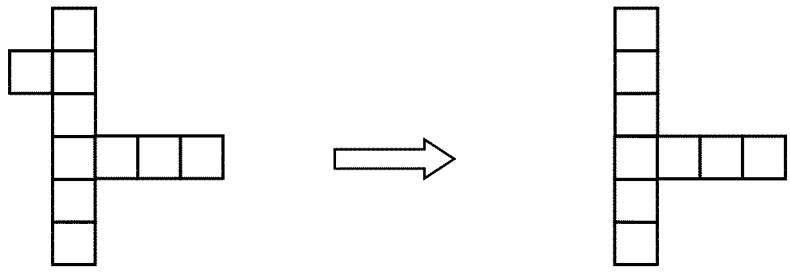
FIGS. 4A-4B show schematic illustrations for elucidating the elimination of a branch (FIG. 4A) or of an intersection point (FIG. 4B)
Figure 4B:
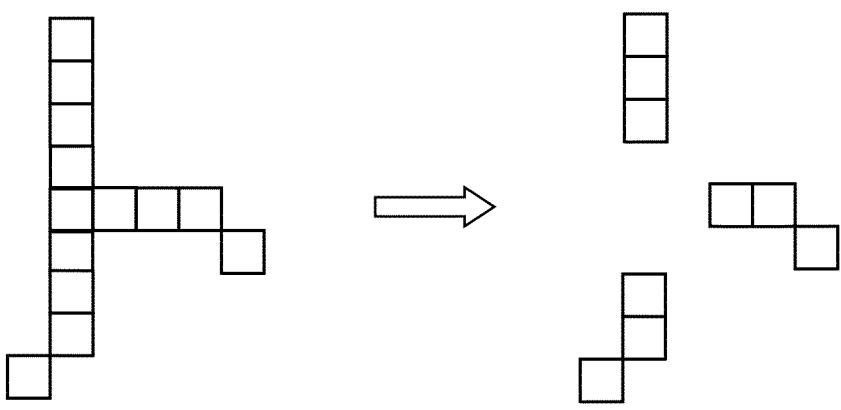

In a subsequent step S130, initially a skeletonization of the edge pixels found previously in step S120 takes place, wherein wider edge fragments are replaced in each case by edge fragments having the width of only one pixel (see FIG. 3A). In this case, it is also possible in particular for two or more narrow edge fragments (each having a width of one pixel) to replace an originally wider edge fragment.

Furthermore, branches or intersection points are also dealt with in step S130. In this case, comparatively short branches (having in particular the length of only one pixel) are deleted, as is illustrated schematically and in highly simplified form in FIG. 4A. If, by contrast, a branch has a greater length (e.g. a length of more than one pixel), the relevant intersection point is deleted with the result that the lines originally coming from said intersection point will now be present in the form of isolated edge fragments, as is illustrated schematically and in highly simplified form in FIG. 4B. This takes account of the fact that, in a "binary" image with only two different types of regions (e.g. coated and uncoated mask regions), the actual existence of such intersection points is ruled out in principle; in other words, at least one of the lines intersecting in said intersection point is "irrelevant" in this respect, that is to say this line does not represent any real transition between the coated and uncoated region.

Subsequently, again with reference to FIG. 1, the previously isolated edge fragments are classified in a further step S140 into "relevant edge fragments" (which in reality represent a transition between a coated and an uncoated region) or "irrelevant edge fragments" (i.e. edge fragments representing no such transition). For this classification (in accordance with an "elimination" of non-relevant or "false" edge fragments), in each case the average intensity gradient is used for the individual edge fragments and compared with a threshold value that has been ascertained in an appropriate manner. Here, only edge fragments for which the average intensity gradient exceeds the ascertained threshold value are considered to be "relevant" within the above meaning.

Figure 5:
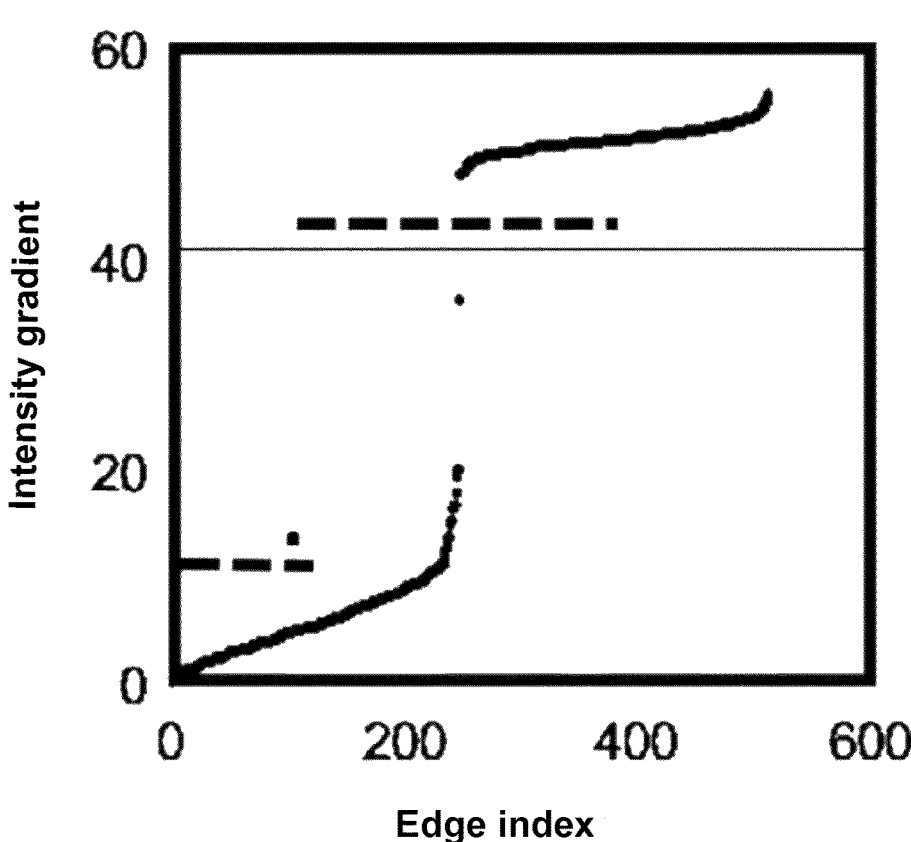
FIG. 5 shows a diagram for elucidating a threshold value-based classification of edge fragments taking place as part of the method according to the invention.
Figure 6A:
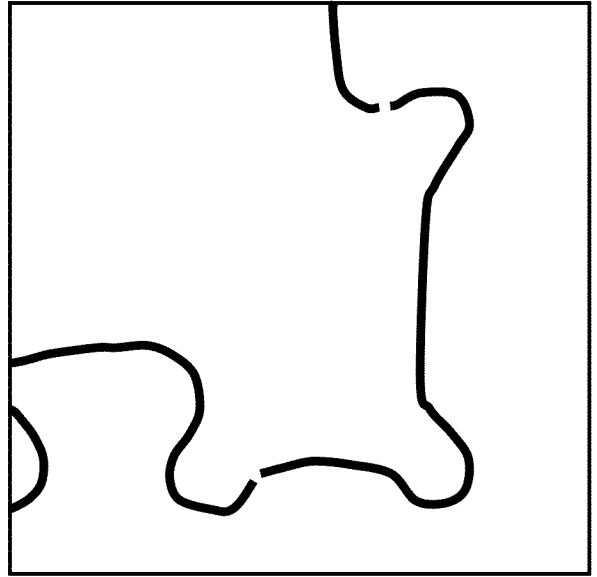
FIGS. 6A-6B show schematic illustrations of an ascer-tainment of contiguous segments, taking place as part of the method according to the invention, in a state without com-pletely closed edge paths.
Figure 6B:
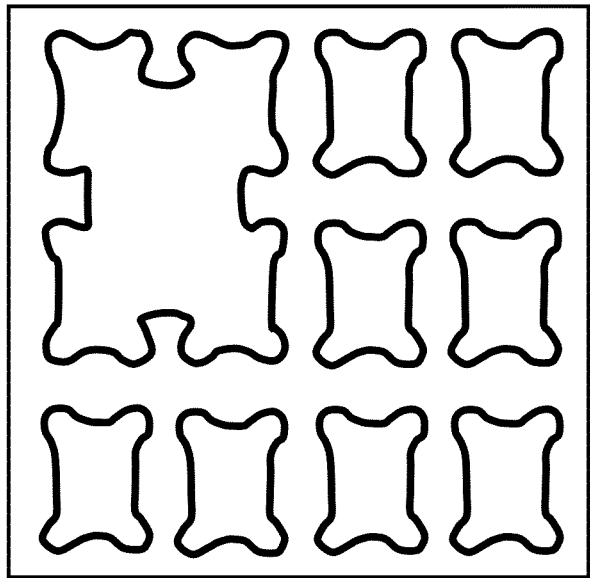
Figure 7:
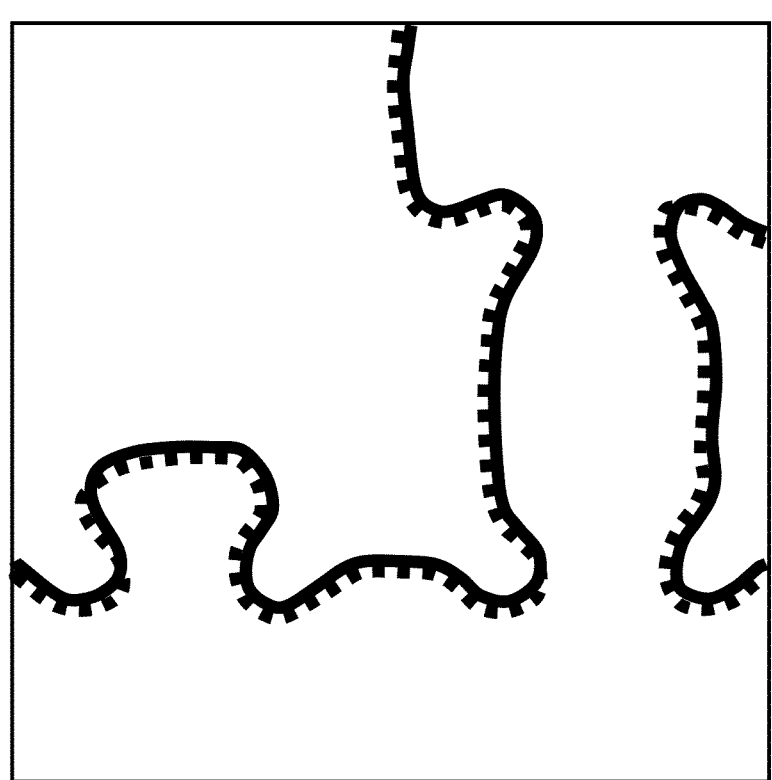
FIG. 7 shows a schematic illustration for elucidating further image processing as part of an active contour method.

The diagram shown in FIG. 5 shows merely by way of example the potential definition of a threshold value on the basis of an exemplary distribution of values of the average intensity gradient for the edge fragments occurring in the image, wherein each index on the horizontal axis corresponds to an edge fragment and wherein the associated value of the average intensity gradient is plotted on the vertical axis.

Said threshold value is in turn preferably defined according to the invention such that specific edge fragments (i.e. the associated average intensity gradients) either are not taken into account when defining the threshold value or are reduced in terms of the gradient value (i.e. are "weakened"). In particular, particularly short edge fragments, particularly high-contrast edge fragments, particularly low-contrast edge fragments and/or edge fragments located near a comparatively brighter edge fragment are possibly not taken into account during the definition of the threshold value. Furthermore, even edge fragments located close to a relatively bright edge fragment can be initially "weakened," i.e. reduced in terms of the value of the average intensity gradient, before the definition of the threshold value.

The previously described pre-processing has the advantage that any "outliers" amongst the edge fragments or the respective values of the average intensity gradient can initially be eliminated with the result that the respective dispersion of the values of the average intensity gradients for the regions that are ultimately to be differentiated (i.e. "bright" and "dark") are reduced, or the relevant value ranges are "homogenized," as it were.

As described below, contiguous segments are ascertained based on the previously classified relevant edge fragments. This ascertainment of contiguous segments is in turn performed preferably without previously closing the gaps that may still be present between said relevant edge fragments, i.e. in a state in which there are not yet any completely closed edge paths (see FIG. 6A).

Again with reference to FIG. 1, in a step S150, edge fragments are clustered into image objects, wherein irrelevant clusters or parts thereof will furthermore be deleted.

Specifically, in step S150, pixels located in interruption regions between successive edge fragments are assigned, in a spacing-based manner, to the one or to the other of the adjoining regions (i.e. the coated or the uncoated region, or the bright segment or the dark segment). With this distance-based assignment, it is possible in particular to complement in each case an existing edge fragment on both sides with in each case a further virtual edge having a width of one pixel, as a result of which it is then possible to ascertain for an edge fragment that is located closest in the interruption region whether it lies closer to the one region (e.g. the region "bright" or the uncoated region) or closer to the other region (e.g. the region "dark" or the coated region). Depending on the result of this distance comparison, each pixel is then assigned to the one or to the other region, such that, as a result of step S150, effectively closed segments are obtained (see FIG. 6B).

Due to the fact that, as has been described above, prior closing of edge paths or edge fragments is dispensed with in the creation of closed segments according to the invention, the method according to the invention is accelerated or simplified, and in addition errors that may be associated with the closing of edge paths are avoided.

Since all edge fragments are now available "in the object context" (i.e. can now be considered in each case to be an integral part either of the coated or of the uncoated region), any remaining objects or edge fragments that in reality clearly do not represent a transition between the coated and the uncoated region can now likewise be eliminated in the image in step S150. These can be in particular objects with comparatively few edge pixels, objects with only one nonclosed edge fragment or edge fragments within an object that branches off a closed polygonal chain. The fact that said elimination of individual objects or edge fragments takes place only at this stage of the method (i.e. rather than in one of the preceding steps) has an advantageous effect on the reliability of the method according to the invention, because unauthorized deletion of specific objects or edge fragments—unauthorized since it takes place while said object context is not yet known—is avoided.

Next, in step S160, the edge coordinates are computed in a subpixel-wise manner. For this purpose, the edge fragments are combined into object edges. A subpixel-accurate position computation can be preferably effected with the use of an active contour method. Here, in each case smoothing and/or homogenization of the gradient image can be effected for the purpose of attaining as constant an external energy along the edge as possible. Furthermore, the support points of the edge path between some or all iteration steps of the active contour method can be adapted such that the distance between in each case two support points along the respective edge is substantially constant. Furthermore, the support points of the edge path even between some or all iteration steps of the active contour method can be adapted such that the distance between two support points along the edge in the region of a comparatively more pronounced edge curvature is reduced. Alternatively, the subpixel-wise computation of the edge position can take place by displacing the edge in its normal direction to the place of maximum gradients.

Next, in step S170, the object edges are selected. For this purpose, irrelevant object edges can be eliminated in a manner similar to step S140. Next, in step S180, a segment image is computed from the object edges, wherein the tonality can be determined from the intensity gradients along the respective edges. In addition, the subpixel information of the edge positions can be represented on the basis of greyscale values in the resultant image.

Figures 8A, 8B:
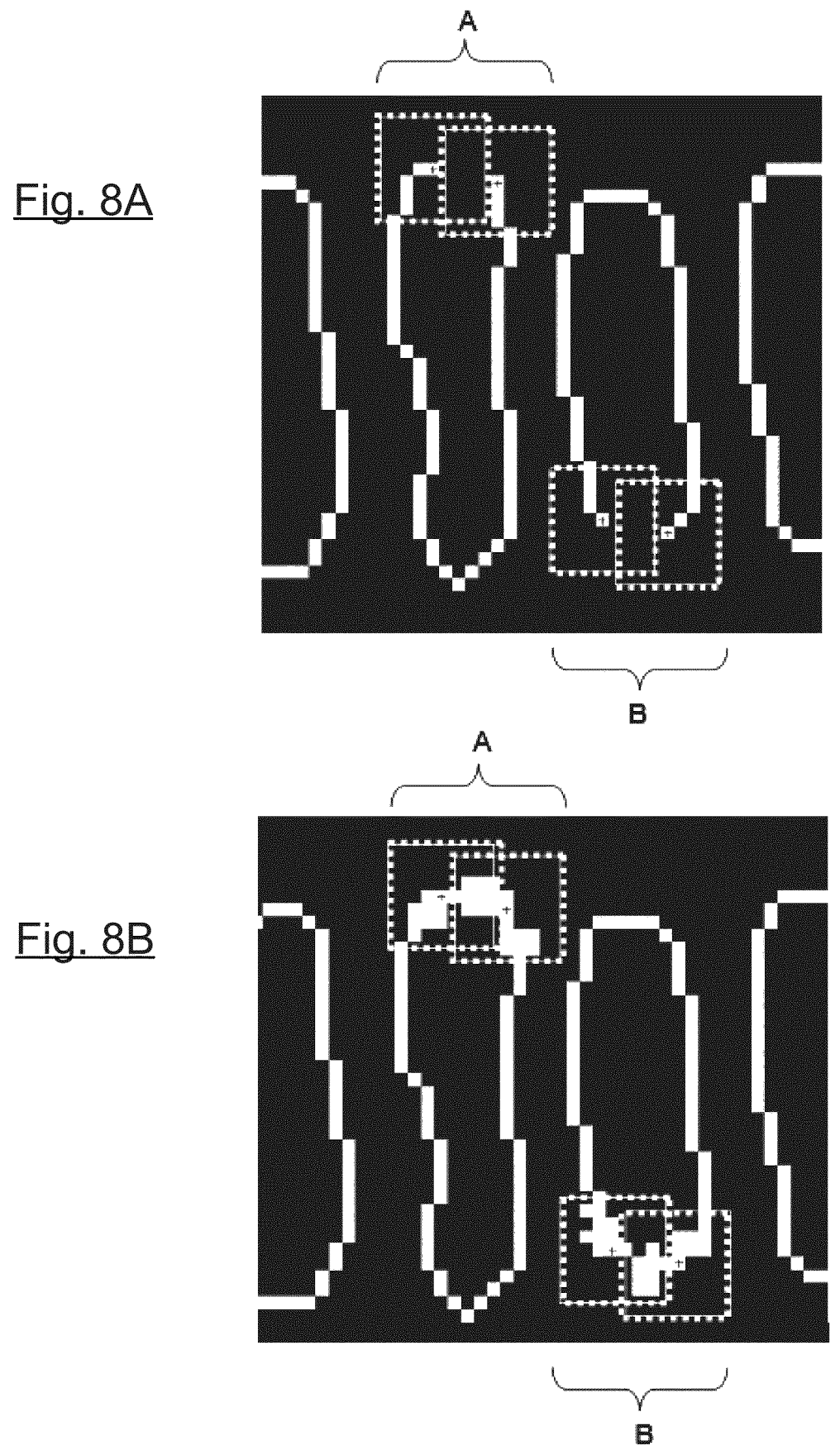

FIGS. 8A-8B show schematic illustrations for elucidating a further embodiment of the method according to the invention, wherein, in contrast to the previously described exemplary embodiment, the image to be analyzed is an SEM image of a wafer.

FIG. 8A in this respect shows, in a manner similar to FIG. 2, a result obtained as a result of step S120 (i.e. as a result of an edge extraction being carried out), wherein in this case merely by way of example a Canny algorithm was used to perform the edge detection or extraction. As is clear from FIG. 8A, the edges detected here have interruptions in regions denoted by "A" and "B", respectively.

In principle, it is possible in embodiments on the basis of the image presented in FIG. 8A to carry out further processing similar to the exemplary embodiment described previously with reference to FIGS. 1-7. However, in a further exemplary embodiment, a "repair" or a closure of the edge path can be effected in the regions "A" and "B". This can be done again by applying a comparatively simple threshold-value-based method to the immediate environment of the interruptions located in the regions "A" and "B". For this purpose, the image according to FIG. 8A is cropped after identification of the interruption regions "A" and "B". In each detail thus produced, edges or contours are produced with a threshold-value-based method that is known per se, wherein the greyscale value of a pixel located in the end section is used as the threshold value for the edge detection or contour generation. The edges or contours extracted in this method thus necessarily run through said end section of the original edge. If two details with the additionally extracted edges or contours overlap according to FIG. 8B, this leads in the exemplary embodiment to a connection between the previously existing end sections and thus to a "repair" of the edge path in the region of the interruption. In turn, a skeletonization of the edges can then be performed for the edge path that has been "repaired" in this manner, similar to the exemplary embodiment described previously with reference to FIG. 1 ff., in order to delimit their widths for example to in each case one pixel.

In some implementations, the various computations and/or processing of data (e.g., images of microlithographic microstructured components) described in this document can be implemented by one or more computers according to the principles described above. For example, isolating a plurality of edge fragments in the image, classifying each of the isolated edge fragments either as a relevant edge fragment or as an irrelevant edge fragment, and ascertaining contiguous segments in the image based on the relevant edge fragments, can be implemented by one or more computers according to the principles described above. In some examples, the processing of data can be performed by one or more cloud computer servers. The one or more computers can include one or more data processors for processing data, one or more storage devices for storing data, such as one or more databases, and/or one or more computer programs including instructions that when executed by the one or more data processors cause the one or more data processors to carry out the processes. The computer can include one or more input devices, such as a keyboard, a mouse, a touch-pad, and/or a voice command input module, and one or more output devices, such as a display, and/or an audio speaker. The computer can show graphical user interfaces on the display to assist the user.

In some implementations, the computer can include digital electronic circuitry, computer hardware, firmware, software, or any combination of the above. The features related to processing of data can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a programmable processor.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

In some implementations, the operations associated with processing of data described in this document can be performed by one or more programmable processors executing one or more computer programs to perform the functions described in this document. A computer program can be written in any form of programming language, including compiled or interpreted languages, and it can be deployed in any form, including as a stand-alone program or as a module, component, subroutine, or other unit suitable for use in a computing environment.

For example, the computer can be configured to be suitable for the execution of a computer program and can include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as hard drives, magnetic disks, magneto-optical disks, or optical disks. Machine-readable storage media suitable for embodying computer program instructions and data include various forms of non-volatile storage area, including by way of example, semiconductor storage devices, e.g., EPROM, EEPROM, and flash storage devices; magnetic disks, e.g., internal hard disks or removable disks; magneto-optical disks; and CD-ROM and DVD-ROM discs.

In some implementations, the processing of data described above can be implemented using software for execution on one or more mobile computing devices, one or more local computing devices, and/or one or more remote computing devices. For instance, the software forms procedures in one or more computer programs that execute on one or more programmed or programmable computer systems, either in the mobile computing devices, local computing devices, or remote computing systems (which may be of various architectures such as distributed, client/server, or grid), each including at least one processor, at least one data storage system (including volatile and non-volatile memory and/or storage elements), at least one wired or wireless input device or port, and at least one wired or wireless output device or port.

In some implementations, the software may be provided on a medium, such as a CD-ROM, DVD-ROM, or Blu-ray disc, readable by a general or special purpose programmable computer or delivered (encoded in a propagated signal) over a network to the computer where it is executed. The functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various system components in the embodiments described above should not be understood as requiring such separation in all embodiments.

Even though the invention has been described on the basis of specific embodiments, numerous variations and alternative embodiments will be apparent to a person skilled in the art, for example through combination and/or exchange of features of individual embodiments. Accordingly, it will be apparent to a person skilled in the art that such variations and alternative embodiments are also encompassed by the present invention, and the scope of the invention is restricted only within the scope of the appended patent claims and the equivalents thereof.

What is claimed is:

1. A method for analyzing an image of a microlithographic microstructured component, wherein in the image each of a multiplicity of pixels is assigned in each case an intensity value, wherein the method comprises the steps of:
   isolating a plurality of edge fragments in the image;
   classifying each of the isolated edge fragments either as a relevant edge fragment or as an irrelevant edge fragment, wherein the relevant edge fragment represents a boundary between a first type of region and a second type of region, and the irrelevant edge fragment does not represent a boundary between the first type of region and the second type of region; and
   ascertaining contiguous segments in the image based on the relevant edge fragments;
   wherein for the ascertainment of contiguous segments pixels located in the surrounding area of in each case one edge fragment are assigned, in a spacing-based manner, to a respective one of the two regions that are separated by this edge fragment;
   wherein for the ascertaining of contiguous segments pixels located in interruption regions between successive edge fragments are assigned, in a spacing-based manner, to the one or to the other of the adjoining regions, wherein an existing edge fragment is complemented on both sides respectively with a further virtual edge having a width of one pixel, and it is ascertained for an edge fragment that is located closest in the interruption region whether it lies closer to the one or to the other of the adjoining regions.

2. The method of claim 1, wherein the classifying of each of the isolated edge fragments is effected based on an average intensity gradient of isolated edge fragments.

3. The method of claim 2, wherein each of the isolated edge fragments is classified based on whether the respective average intensity gradient of an isolated edge fragment exceeds a threshold value.

4. The method of claim 3, wherein some of the isolated edge fragments are not taken into account for the defining of the threshold value, wherein the isolated edge fragments not taken into account for the defining of the threshold value comprise at least one of particularly short edge fragments, particularly high-contrast edge fragments, particularly low-contrast edge fragments, or edge fragments located near a comparatively brighter edge fragment.

5. The method of claim 1, wherein the contiguous segments are ascertained without prior closing of gaps present between the edge fragments.

6. The method of claim 1, wherein furthermore irrelevant edge fragments are eliminated during the ascertainment of contiguous segments.

7. The method of claim 1, wherein edge fragments are combined into object edges and the edge coordinates are computed in a subpixel-wise manner after the ascertainment of contiguous segments.

8. The method of claim 7, wherein irrelevant object edges are eliminated after said combination of edge fragments into object edges.

9. The method of claim 8, wherein a segment image is computed after said elimination of irrelevant object edges.

10. The method of claim 1, wherein before a plurality of edge fragments are isolated, image pre-processing for reducing a noise component is carried out.

11. The method of claim 1, wherein isolating a plurality of edge fragments comprises eliminating branches having lengths that fall below a specified value.

12. The method of claim 1, wherein isolating a plurality of edge fragments comprises eliminating intersection points at which at least three edges intersect.

13. The method of claim 1, wherein the image is divided by way of the segments into a total of two different regions which differ in terms of a material that is located in the respective region.

14. The method of claim 1, wherein the microstructured component is a mask.

15. The method of claim 14, wherein the mask is designed for a working wavelength of less than 250 nm.

16. The method of claim 1, wherein the microstructured component is a wafer.

17. An apparatus for analyzing an image of a microlithographic microstructured component, wherein the apparatus is designed to carry out the method of claim 1.

18. The apparatus of claim 17, wherein the classifying of each of the isolated edge fragments is effected based on an average intensity gradient of isolated edge fragments.

19. An apparatus for analyzing an image of a microlithographic microstructured component, the image comprising a plurality of pixels, each pixel being assigned an intensity value, the apparatus comprising:

a storage device storing instructions;

at least one data processor configured to execute the instructions to implement a process comprising:

isolating a plurality of edge fragments in the image;

classifying each of the isolated edge fragments either as a relevant edge fragment or as an irrelevant edge fragment, wherein the relevant edge fragment represents a boundary between a first type of region and a second type of region, and the irrelevant edge fragment does not represent a boundary between the first type of region and the second type of region; and ascertaining contiguous segments in the image based on the relevant edge fragments;

wherein for each edge fragment, pixels located in a surrounding area of the edge fragment are assigned, in a spacing-based manner, to a respective one of two regions that are separated by the edge fragment;

wherein for the ascertaining of contiguous segments pixels located in interruption regions between successive edge fragments are assigned, in a spacing-based manner, to the one or to the other of the adjoining regions, wherein an existing edge fragment is complemented on both sides respectively with a further virtual edge having a width of one pixel, and it is ascertained for an edge fragment that is located closest in the interruption region whether it lies closer to the one or to the other of the adjoining regions.

20. The apparatus of claim 19 in which the classifying of each of the isolated edge fragments is effected based on an average intensity gradient of isolated edge fragments.

21. The method of claim 1, comprising modifying the microstructured component based on an analysis of the contiguous segments in the image.

22. The method of claim 1, comprising identifying errors in the microstructured component based on an analysis of the contiguous segments in the image, and modifying the microstructured component to correct the errors.

23. The method of claim 14, wherein the mask is designed for a working wavelength of less than 200 nm.

24. The method of claim 14, wherein the mask is designed for a working wavelength of less than 15 nm.

25. The method of claim 1 wherein the relevant edge fragment represents a boundary between a coated region and an uncoated region, and the irrelevant edge fragment does not represent a boundary between a coated region and an uncoated region.

26. The method of claim 1 wherein the relevant edge fragment represents a boundary between a structure-carrying region and a structure-less region, and the irrelevant edge fragment does not represent a boundary between a structure-carrying region and a structure-less region.

27. The apparatus of claim 17 wherein the relevant edge fragment represents a boundary between a coated region and an uncoated region, and the irrelevant edge fragment does not represent a boundary between a coated region and an uncoated region.

28. The apparatus of claim 17 wherein the relevant edge fragment represents a boundary between a structure-carrying region and a structure-less region, and the irrelevant edge fragment does not represent a boundary between a structure-carrying region and a structure-less region.

29. The apparatus of claim 19 wherein the relevant edge fragment represents a boundary between a coated region and an uncoated region, and the irrelevant edge fragment does not represent a boundary between a coated region and an uncoated region.

30. The apparatus of claim 19 wherein the relevant edge fragment represents a boundary between a structure-carrying region and a structure-less region, and the irrelevant edge fragment does not represent a boundary between a structure-carrying region and a structure-less region.

31. The method of claim 1 wherein ascertained contiguous segments do not include irrelevant edge fragments.

* * * * *